US012694540B2

(12) United States Patent
Chan et al.

(10) Patent No.:    US 12,694,540 B2
(45) Date of Patent:         Jul. 28, 2026

(54) JOINT COUNT AND FLOW ANALYSIS FOR VIDEO CROWD SCENES

(71) Applicant: The Hong Kong University of Science and Technology, Hong Kong (CN)

(72) Inventors: Shueng Han Gary Chan, Hong Kong (CN); Sizhe Song, Hong Kong (CN)

(73) Assignee: THE HONG KONG UNIVERSITY OF SCIENCE AND TECHNOLOGY, Hong Kong (CN)

( * ) Notice: Subject to any disclaimer, the term of this patent is extended or adjusted under 35 U.S.C. 154(b) by 266 days.

(21) Appl. No.: 18/220,077

(22) Filed: Jul. 10, 2023

(65) Prior Publication Data

US 2024/0144490 A1      May 2, 2024

Related U.S. Application Data

(60) Provisional application No. 63/415,670, filed on Oct. 13, 2022.

(51) Int. Cl.
G06T 7/269          (2017.01)
G06T 7/246          (2017.01)

(52) U.S. Cl.
CPC .............. G06T 7/269 (2017.01); G06T 7/246 (2017.01); *G06T 2207/10016* (2013.01); *G06T 2207/20081* (2013.01); *G06T 2207/30242* (2013.01)

(58) Field of Classification Search
CPC . G06T 2207/20084; G06T 2207/10016; G06T 2207/20081; G06T 7/20;

(Continued)

(56) References Cited

U.S. PATENT DOCUMENTS

| | | | |
|---|---|---|---|
| 6,507,661 B1 * | 1/2003 | Roy | ........................ G06T 7/269 |
| | | | 382/103 |
| 2004/0234136 A1 * | 11/2004 | Zhu | ...................... G06V 10/255 |
| | | | 382/103 |

(Continued)

FOREIGN PATENT DOCUMENTS

| | | |
|---|---|---|
| CN | 103218816 A | 7/2013 |
| CN | 110503666 A | 11/2019 |

(Continued)

OTHER PUBLICATIONS

Jia, Chunhua, et al., "Crowd Anomaly Detection Based on Elevator Internet of Things Technology", *Industrial IoT 2020, LNICST* 365, pp. 3-17.

(Continued)

*Primary Examiner* — Alex Kok S Liew
(74) *Attorney, Agent, or Firm* — Leydig, Voit & Mayer, Ltd.

(57) ABSTRACT

A system for flow-count includes one or more cameras and a processing system. The one more cameras are configured to capture image data comprising a sequence of frames. The processing system is configured to extract spatial features and temporal features based on the sequence of frames; construct, based on the spatial features and temporal features, a density map and/or a flow map corresponding to a frame of the sequence of frames, wherein the density map comprises density values for the plurality of pixels, wherein the flow map comprises two-dimensional (2D) vectors for the plurality of pixels, and wherein a 2D vector indicates a speed and direction for a pixel of the plurality of pixels in the frame; and determine, based on the density map and/or the flow map, a count, a distribution, and/or movement of objects corresponding to the frame.

20 Claims, 7 Drawing Sheets

(58) Field of Classification Search
CPC ......... G06T 2207/10028; G06T 3/4046; G06T
7/269; G06T 7/248; G06T 7/11; G06T
2207/10024; G06T 9/002; G06T 5/70;
G06T 7/246; G06T 2207/30241; G06T
5/50; G06T 7/251; G06T 7/70; G06T
3/18; G06T 7/215; G06T 2207/20076;
G06T 2207/20201; G06T 5/73; G06T
2207/30252; G06T 7/579; G06T 5/80;
G06T 7/73; G06T 3/4007; G06T 5/60;
G06T 7/38; G06T 7/0012; G06T 7/50;
G06T 2207/20221; G06T 7/55; G06T
19/20; G06T 2207/10081; G06T
2207/20048; G06T 2207/30036; G06T
2207/30244; G06T 7/30; G06T 7/75;
G06T 7/593; G06N 3/045; G06N 3/084;
G06N 3/08; G06N 3/088; G06N 3/044;
G06N 3/047; G06N 3/048; G06N 20/00;
G06N 3/0464; G06N 3/09; G06N 3/04;
G06N 3/0455
See application file for complete search history.

(56) References Cited

U.S. PATENT DOCUMENTS

| | | | | |
|---|---|---|---|---|
| 2020/0357099 A1* | 11/2020 | Long | ........................ | G06T 5/77 |
| 2022/0180459 A1 | 6/2022 | Felemban et al. | | |

FOREIGN PATENT DOCUMENTS

| | | |
|---|---|---|
| CN | 211423913 U | 9/2020 |
| CN | 111860162 | 10/2020 |
| CN | 112767451 A | 5/2021 |
| CN | 113536985 A | 10/2021 |
| CN | 114429665 A | 5/2022 |
| CN | 114782883 A | 7/2022 |

OTHER PUBLICATIONS

Sundararaman, R. et al., "Tracking Pedestrian Heads in Dense Crowd", in *Proceedings of the IEEE/CVF Conference on Computer Vision and Pattern Recognition*, 2021, pp. 3865-3875.
Bai, S. et al., "Deep Equilibrium Optical Flow Estimation," in *Proceedings of the IEEE/CVF Conference on Computer Vision and Pattern Recognition*, 2022, pp. 620-630.
Dosovitskiy, A. et al., "An Image is Worth 16x16 Words: Transformers for Image Recognition at Scale," *arXiv preprint arXiv:2010. 11929v1*, 2020, pp. 1-21.

Liu, Z. et al., "Swin Transformer: Hierarchical Vision Transformer using Shifted Windows," in *Proceedings of the IEEE/CVF International Conference on Computer Vision*, 2021, pp. 10012-10022.
Zhang, Y. et al., "Single-Image Crowd Counting via Multi-Column Convolutional Neural Network," in *Proceedings of the IEEE conference on computer vision and pattern recognition*, 2016, pp. 589-597.
Li, Y. et al., "CSRNet: Dilated Convolutional Neural Networks for Understanding the Highly Congested Scenes", in *Proceedings of the IEEE conference on computer vision and pattern recognition*, 2018, pp. 1091-1100.
Liu, W. et al., "Context-Aware Crowd Counting," in *Proceedings of the IEEE/CVF conference on computer vision and pattern recognition*, 2019, pp. 5099-5108.
Bai, Haoyue et al., "CNN-based Single Image Crowd Counting: Network Design, Loss Function and Supervisory Signal", *arXiv preprint arXiv:2012.15685*, 2020, pp. 1-25.
Cao, Jinkun, et al., "Observation-Centric SORT: Rethinking SORT for Robust Multi-Object Tracking", *arXiv preprint arXiv:2203. 14360v1*, 2022, (19 pages).
Fang, Yanyan et al., "Locality-Constrained Spatial Transformer Network for Video Crowd Counting", In *2019 IEEE international conference on multimedia and expo (ICME)*, pp. 814-819. IEEE, 2019.
Hossain, Mohammad Asiful, et al., "Video-Based Crowd Counting Using a Multi- Scale Optical Flow Pyramid Network", In *Proceedings of the Asian Conference on Computer Vision (ACCV)*, pp. 3-20, Nov. 2020.
Xiong, Feng, et al., "Spatiotemporal Modeling for Crowd Counting in Videos", In *Proceedings of the IEEE international conference on computer vision*, pp. 5151-5159, 2017. 1, 2.
Li, Haopeng, at el., "Video Crowd Localization with Multifocus Gaussian Neighborhood Attention and a Large-Scale Benchmark", *IEEE Transactions on Image Processing*, vol. 31:6032-6047, 2022. 2, 4, 6, 7.
Liu, Weizhe, et al., "Estimating People Flows to Better Count them in Crowded Scenes", In *European Conference on Computer Vision*, pp. 723-740. Springer, 2020.
Meng, S. et al., "PHNet: Parasite-Host Network for Video Crowd Counting", in *2020 25th International Conference on Pattern Recognition (ICPR)*. IEEE, 2021, pp. 1956-1963.
Loshchilov, I et al., "Decoupled Weight Decay Regularization," *arXiv preprint arXiv:1711.05101*, 2017, published as a conference paper at ICLR 2019.
Schröder, G. et al., "Optical Flow Dataset and Benchmark for Visual Crowd Analysis," in *2018 15th IEEE International Conference on Advanced Video and Signal Based Surveillance (AVSS)*, IEEE, 2018, pp. 1-6, arXiv:1811.07170v1, Nov. 2018.

* cited by examiner

100

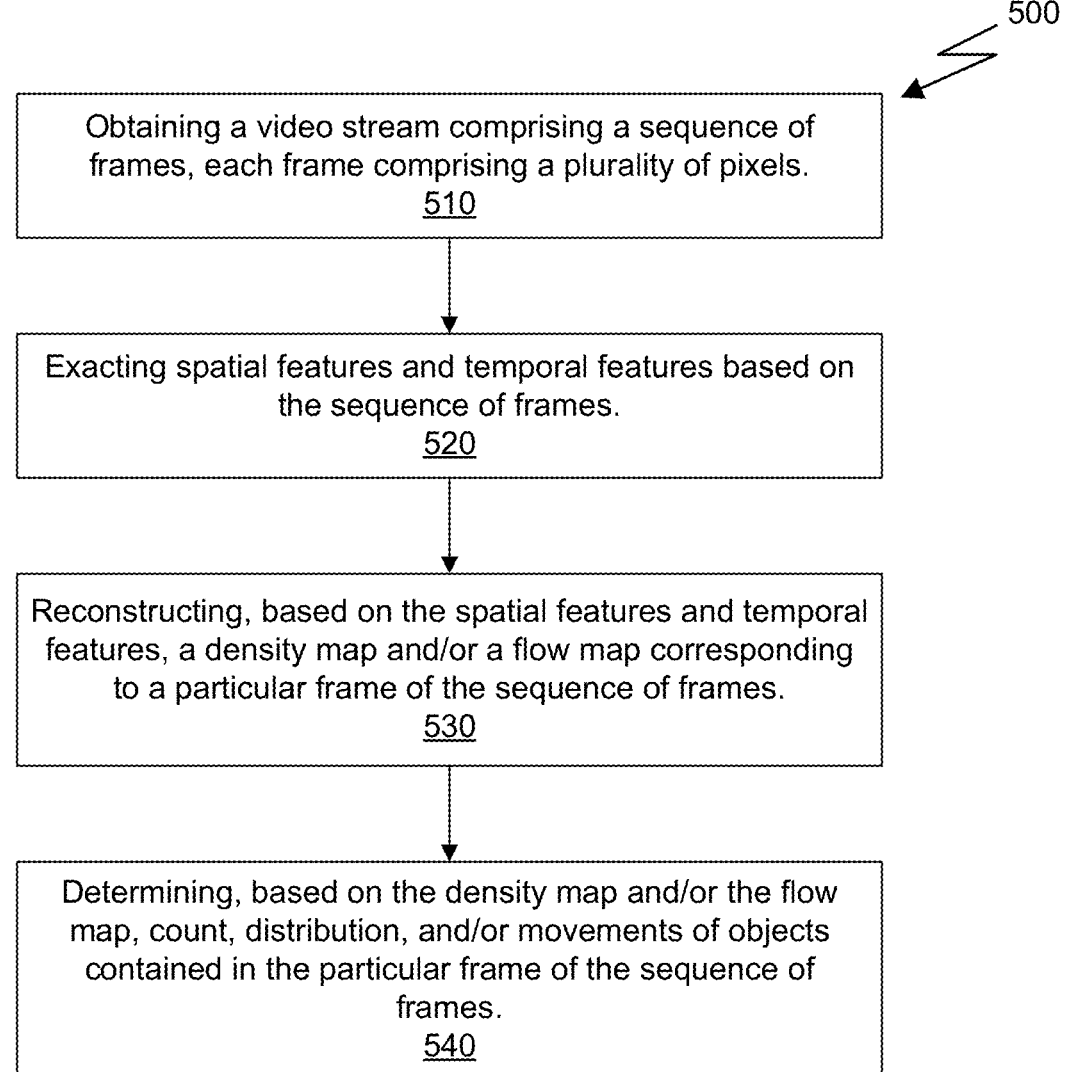

500

Obtaining a video stream comprising a sequence of frames, each frame comprising a plurality of pixels.
510

Exacting spatial features and temporal features based on the sequence of frames.
520

Reconstructing, based on the spatial features and temporal features, a density map and/or a flow map corresponding to a particular frame of the sequence of frames.
530

Determining, based on the density map and/or the flow map, count, distribution, and/or movements of objects contained in the particular frame of the sequence of frames.
540

JOINT COUNT AND FLOW ANALYSIS FOR VIDEO CROWD SCENES

CROSS-REFERENCE TO RELATED APPLICATIONS

This application claims the benefit of U.S. Provisional Application No. 63/415,670 titled "JOINT COUNT AND FLOW ANALYSIS FOR VIDEO CROWD SCENES," filed Oct. 13, 2022, the entire content of which is incorporated herein by reference.

BACKGROUND

Crowd counting is to estimate the number of objects in an image or video frame. Crowd counting on pedestrians has attracted much attention in recent years due to its importance in security and crowd management. Because pedestrian data are usually collected by fixed surveillance cameras, they are video sequences in nature. In contrast to single images, people in a video may appear in multiple consecutive frames. Such temporal information is referred to as people flow or crowd flow. As people's movement and location are correlated, utilizing flow information in video crowd counting has been shown to attain higher accuracy than simply treating the video frames separately as independent images.

Some previous works on video crowd counting adopt the tracking-based approach, where pedestrians are individually tracked in videos and the count is simply the number of generated bounding boxes. Such an approach is effective for sparse scenes, but its accuracy quickly degrades under highly crowded condition. Furthermore, it is costly in annotation and computation. Most video crowd counting methods apply temporal modules without explicit supervision on people flow, which undermines their people flow extraction and counting accuracy. An existing flow-based network requires video optical flow as inputs, which is inefficient at the inference stage due to the delay of this tandem design. Furthermore, irrelevant objects in raw optical flow may lead to counting errors. Another work applies a grid-based flow representation that focuses on flow between adjacent grids, which requires finetuning the grid size as a hyperparameter in different crowd scenes.

The following presents some existing methods for video crowd analysis, which could be classified into four major categories.

The first category is single-image crowd counting. Most approaches for single-image crowd counting are regression-based methods that consider the crowd counting problem as a pixel-wise regression task, where the value of each pixel represents the density of the neighborhood. The summation of this matrix, named as density map, gives the total people count in the corresponding image. The ground-truth density maps for training are derived from the positions of pedestrians in images, usually recorded as the center coordinates of human heads. A Gaussian filter is then applied to convert all coordinates, a sparse matrix of discrete dots, into a density map which is more desirable for regression. Some approaches in this category apply multi-column convolution and dilated convolution respectively to tackle scale variation problem and extend the receptive field of the layers, while some other approaches in this category focus on adaptively encoding the contextual information under different scales.

The second category is tracking-based methods. Researchers used to explore pure detection methods where crowd count is simply given by the number of bounding boxes generated, which were proved to be inaccurate when the number of people grows and the overlap between human bodies increases. Recently, research works have re-introduced detection (tracking) to video crowd analysis, switching from entire human bodies to only human heads as tracking targets. However, the efficacy of tracking-based methods is undermined by expensive annotation and computation costs. Tracking human heads require a large number of bounding box annotation on small objects. Some work in this category annotates over two million heads in their dataset, which indicates the exhausting annotation work when finetuning networks on unseen scenarios. The computation cost grows with the number of people as the model re-identifies human heads.

The third category is video crowd counting. Given the success of density map regression, this paradigm is also extended to the video domain. The naive idea is to concatenate multiple frames in the input and apply a 3D convolution to predict density maps for each frame. Existing work uses LSTM to strengthen temporal information encoding and encodes spatial and temporal information separately in two branches and merges the features at the end for density map regression. Some work further studies the location of pedestrians as extra supervision. However, these methods do not explicitly model the people flow information and provides no corresponding supervision, completely relying on the network itself to learn the temporal information in videos. Such implicitness weakens the networks' ability to extract people flow and undermines their counting accuracy.

The fourth category is flow-based methods. People flow or crowd flow refers to the movement of the crowd, which has been shown to be essential for the video counting task. Some work requires video optical flow directly as their network inputs, making it less efficient during inference stage due to the delay of optical flow estimation. Also, the irrelevant objects in raw optical flow can be further refined to focus on the crowd. Some work applies a grid-based representation for crowd flow. The design provides better constraints for density regression. However, the choice of grid size as a hyperparameter becomes a crucial factor and may require scene-dependent finetuning. A larger grid size would better capture longer displacement but compromise the flow precision at the same time. Different movements can be regarded as the same flow simply because they begin and end in the same grid. On the other hand, a smaller grid size would lose the details of those faster people flow. In other words, trade-offs must be made based on the actual application.

SUMMARY

In an exemplary embodiment, the present application provides a system, comprising: one or more cameras configured to capture image data, the image data comprising a video stream that comprises a sequence of frames, each frame comprising a plurality of pixels; and a processing system. The processing system is configured to: extract spatial features and temporal features based on the sequence of frames; construct, based on the spatial features and temporal features, a flow map corresponding to a frame of the sequence of frames, wherein the flow map comprises two-dimensional (2D) vectors for the plurality of pixels, and wherein a respective 2D vector indicates a speed and direction for a respective pixel of the plurality of pixels in the frame; and determine, based on the flow map, movement of objects corresponding to the frame.

In a further exemplary embodiment, to extract the spatial features and temporal features based on the sequence of frames, the processing system is further configured to: extract, for each frame of the sequence of frames, the spatial features at multiple scales; and extract, the temporal features from the sequence of frames.

In a further exemplary embodiment, the construction, based on the spatial features and temporal features, of the flow map corresponding to the frame of the sequence of frames is based on the spatial features at the multiple scales and the temporal features.

In a further exemplary embodiment, the spatial features and the temporal features are extracted in sequence.

In a further exemplary embodiment, the spatial features and the temporal features are extracted concurrently.

In a further exemplary embodiment, the processing system is further configured to: construct, based on the spatial features at the multiple scales and temporal features, a density map corresponding to the frame of the sequence of frames, wherein the density map comprises density values for the plurality of pixels; and determine, based on the flow map and the density map, at least one of a count or a distribution of the objects corresponding to the frame.

In a further exemplary embodiment, the processing system is further configured to: filter, based on the spatial features and the temporal features, data irrelevant to the objects contained in the sequence of video frames, wherein the constructed density map and flow map associated with the frame do not include the irrelevant data.

In a further exemplary embodiment, the objects are persons contained in the sequence of video frames, the irrelevant data includes non-human objects, and the constructed density map and flow map do not include non-human objects.

In a further exemplary embodiment, the processing system is further configured to: compute a first loss between the constructed flow map and a ground-truth flow map for the frame of the sequence of frames; and train, based on the first loss, a model for determining the count, distribution, and movement of the objects contained in the frame of the sequence of frames.

In a further exemplary embodiment, the processing system is further configured to: construct, based on the spatial features and temporal features, a density map corresponding to the frame of the sequence of frames, wherein the density map comprises density values for the plurality of pixels; compute a second loss between the constructed density map and a ground-truth density map for the frame of the sequence of frames; and train, based on the first loss and the second loss, the model for determining at least one of a count, a distribution, or the movement of the objects contained in the frame of the sequence of frames.

In a further exemplary embodiment, the processing system is further configured to: perform at least one of crowd management, service optimization, or security monitoring, based on the count, distribution, and movement of objects contained in the frame of the sequence of frames.

In another exemplary embodiment, the present application provides a method, comprising: obtaining, by a processing system, a video stream comprising a sequence of frames, each frame comprising a plurality of pixels; extracting, by the processing system, spatial features and temporal features based on the sequence of frames; constructing, by the processing system, based on the spatial features and temporal features, a flow map corresponding to a frame of the sequence of frames, wherein the flow map comprises two-dimensional (2D) vectors for the plurality of pixels, and wherein a 2D vector indicates a speed and direction for a pixel of the plurality of pixels in the frame; and determining, by the processing system, based on the flow map, movement of objects corresponding to the frame.

In a further exemplary embodiment, extracting the spatial features and temporal features based on the sequence of frames further comprises: extracting, by the processing system, for each frame of the sequence of frames, the spatial features at multiple scales; and extracting, by the processing system, the temporal features from the sequence of frames.

In a further exemplary embodiment, the constructing, by the processing system, based on the spatial features and temporal features, the flow map corresponding to the frame of the sequence of frames is based on the spatial features at the multiple scales and the temporal features.

In a further exemplary embodiment, the spatial features and the temporal features are extracted in sequence.

In a further exemplary embodiment, the spatial features and the temporal features are extracted concurrently.

In a further exemplary embodiment, the method further comprises: constructing, based on the spatial features at the multiple scales and temporal features, a density map corresponding to the frame of the sequence of frames, wherein the density map comprises density values for the plurality of pixels, and determining, based on the flow map and the density map, at least one of a count and distribution of the objects corresponding to the frame.

In a further exemplary embodiment, the method further comprises filtering, by the processing system, based on the spatial features and the temporal features, data irrelevant to the objects contained in the sequence of video frames. The constructed density map and flow map associated with the frame do not include the irrelevant data.

In a further exemplary embodiment, the objects are persons contained in the sequence of video frames, the irrelevant data includes non-human objects, and the constructed density map and flow map do not include non-human objects.

In yet another exemplary embodiment, the present application provides a non-transitory computer-readable medium having processor-executable instructions stored thereon. The processor-executable instructions, when executed, facilitate performance of the following: obtaining a video stream comprising a sequence of frames, each frame comprising a plurality of pixels; extracting spatial features and temporal features based on the sequence of frames; constructing, based on the spatial features and temporal features, a flow map corresponding to a frame of the sequence of frames, wherein the flow map comprises two-dimensional (2D) vectors for the plurality of pixels, and wherein a 2D vector indicates a speed and direction for a pixel of the plurality of pixels in the frame; and determining, based on the flow map, a count, a distribution, and movement of objects corresponding to the frame.

BRIEF DESCRIPTION OF THE DRAWINGS

The present systems and methods for image processing are described in detail below with reference to the attached drawing figures, wherein:

FIG. 5 is a flowchart of a Flow-Count process, in accordance with some embodiments.

DETAILED DESCRIPTION

Figure 1A:
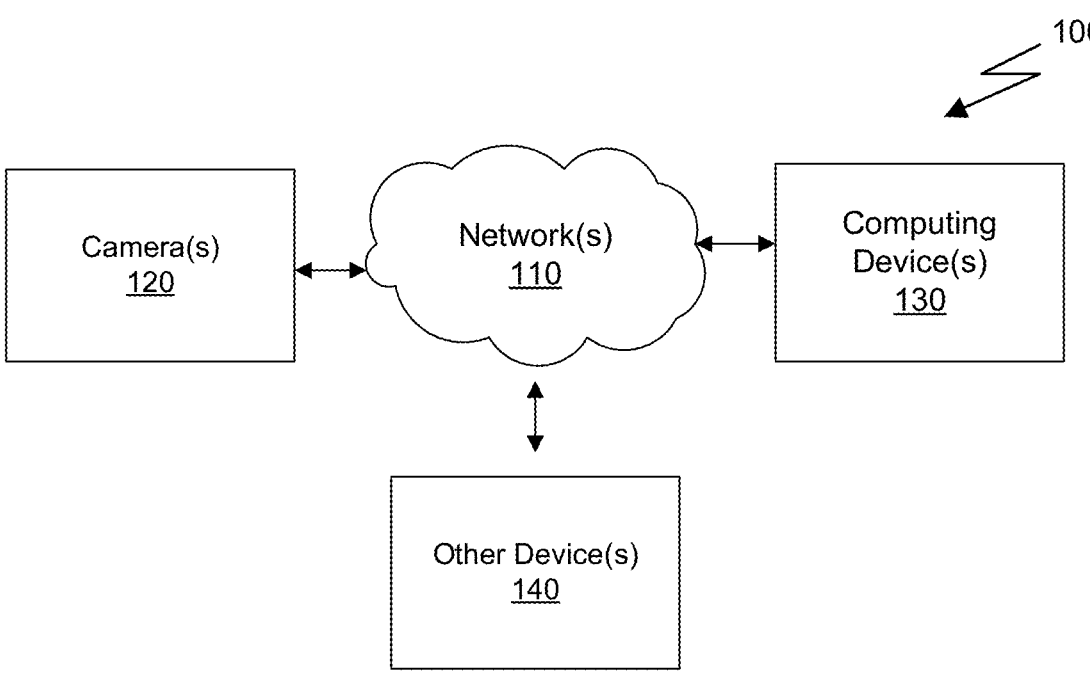
FIGS. 1A-1B illustrate a network environment for implementing techniques in the present disclosure, in accordance with some embodiments.

Exemplary embodiments of the present disclosure provide image processing techniques for use, among other applications, in crowd counting with improved efficiency and accuracy relative to conventional techniques. Exemplary embodiments of the present disclosure may be referred to herein as providing a "Flow-Count" scheme which utilizes people flow information to achieve accurate and efficient video crowd analysis.

In some examples, the people flow information is represented by a pixel-level people flow map, which indicates movement information of people contained in a stream of video frames. The movement information may include the moving speed and direction of a particular object (e.g., a human head), which may be parameterized as a two-dimensional (2D) vector. For instance, a pixel-level people flow map for a particular video frame may include a number of pixels, where each pixel may be associated with a 2D vector indicating the speed and direction of the particular pixel.

In some instances, a Flow-Count network utilizes the pixel-level people flow map as a supervision signal for training and/or prediction. For example, the Flow-Count network may tackle massive video crowd analysis task as a regression problem. By learning the people flow information together with counting, the Flow-Count network is able to utilize the flow information to improve its counting accuracy. During inference time, the flow estimation may be disabled, while the trained Flow-Count network remains efficient and at the same time operates at reduced computational cost.

The Flow-Count scheme, for example when implemented in a video crowd counting system, can be applied to a wide range of applications, such as crowd management (e.g., at World Expos, concerts, sports events), service optimization (e.g., at Mass Transit Railway (MTR)), security monitoring, etc. For instance, a video crowd counting system may take video frames as input and may output density maps and people flow maps. The video crowd counting system may further sum up the density maps to obtain the number of people in the video frames.

When applied to the service optimization of MTR, the obtained people count may be used to find out how many customers are waiting on the platform, which informs a determination as to whether to increase or decrease the amount of trains in service. In an exemplary implementation, a train scheduling system may automatically respond to an analysis of the number of people utilizing the MTR at a given time (e.g., by scheduling more or less trains). The analysis may be a trend-based analysis which takes into consideration people count data over a period of days, weeks, or months, or may be performed in real-time.

In some variations, the video crowd counting system may partially sum up the density maps to obtain the number of people in a certain region. For example, sports events or concerts usually divide the audience into different zones. As such, the Flow-Count scheme can be used to monitor the real-time population of each zone/entrance, and alerts or other responsive actions (such as dispatching of venue personnel or security) may be triggered based on detecting that the number of people in a particular region is above a threshold amount.

A people flow map indicates the movement of people at a specific moment, while a corresponding density map indicates the number of people present at that particular moment. By examining identical pixels in both maps, the number of people moving in a particular direction may be determined. To this end, the Flow-Count scheme can be utilized to monitor a specific area and calculate the inflow and/or outflow within it. Then, for example, if an area exhibits consistently high inflows and low outflows, it may indicate a potential risk of a stampede. Accordingly, the video crowd counting may generate alerts and/or perform other responsive actions (such as dispatching of venue personnel or security) based on detecting certain conditions (such as detecting too many inflows relative to an amount of outflows over a period of time).

FIG. 1A illustrates a network environment 100 for implementing techniques in the present disclosure, in accordance with some embodiments.

Network environments suitable for use in implementing embodiments of the disclosure may include one or more cameras 120, one or more computing devices 130 and/or other devices 140.

By way of example and not limitation, a camera 120 may be embodied as an image capturing device, such as a video camera, a surveillance device/system, a drone, a robot, etc., or an imaging module integrated in an electronic device/system, such as a smartphone, or an autonomous vehicle). In some examples, the one or more cameras 120 may be positioned at predetermined locations in an environment (e.g., a subway station, a shopping mall, etc.). Each camera 120 may be configured to obtain video streams for a specific field of view in the environment. A video stream is a continuous flow of video data transmitted over a network or delivered in real-time to a recipient. A video stream includes a sequence of video frames, which are individual images that make up a video. In some circumstances, the video frames may be encoded and compressed to reduce file size and enable efficient transmission. The cameras 120 may be configured to record the video at a predetermined rate (e.g., frames per minute), which may be referred to as a frame rate.

Computing device(s) 130 may include one or more client devices, one or more servers or a combination thereof. Examples of a computing device 130 may include but not limited to a Personal Computer (PC), a laptop computer, a workstation, etc. Other device(s) 140 may include network attached storage (NAS), other backend devices, or any other suitable device.

Components of a network environment 100 may communicate with each other via a network(s) 110, which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment 100 may include one or more cloud-based network environments, a distributed computing environment, a combination thereof, etc. A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). A cloud-based network environment may be private (e.g., limited to a single organization), may be public (e.g., available to many organizations), and/or a combination thereof (e.g., a hybrid cloud environment).

Figure 1B:
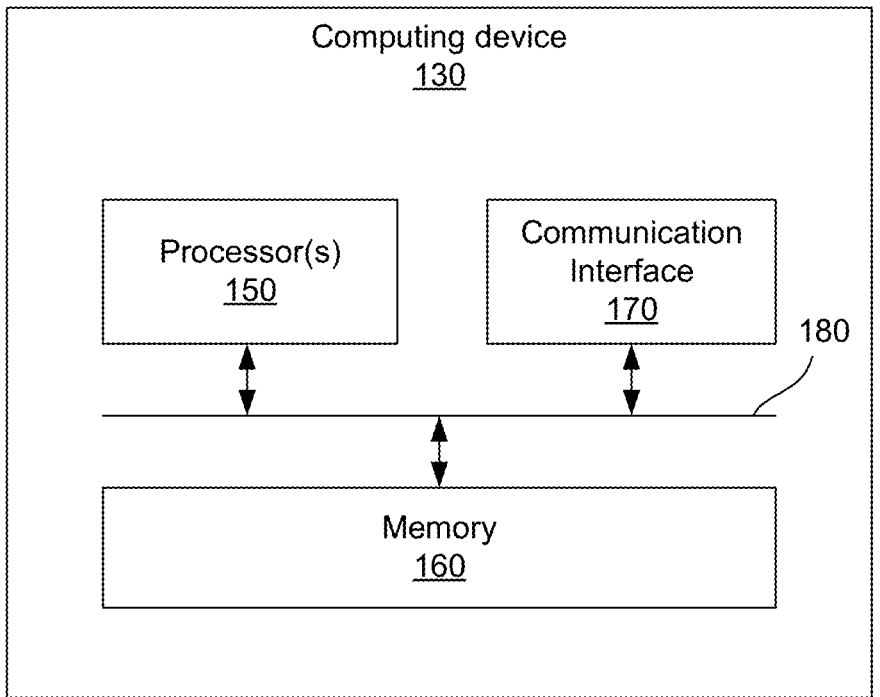

FIG. 1B illustrates a block diagram of an exemplary computing device 130 configured to implement various functions in accordance with some embodiments in the present disclosure.

As shown in FIG. 1B, the computing device 130 may include one or more processors 150, a communication interface 170, and a memory 160. The one or more processors 150, communication interface 170, and memory 160 may be communicatively coupled to a bus 180 to enable communication therebetween. The processor(s) 150 may be configured to perform the operations in accordance with the instructions stored in memory 160. The processor(s) 150 may include any appropriate type of general-purpose or special-purpose microprocessor, such as central processing unit (CPU), graphic processing unit (GPU), parallel processing unit (PPU), etc. The memory 160 may be configured to store computer-readable instructions that, when executed by the processor(s) 150, can cause the processor(s) 150 to perform various operations disclosed herein. The memory 160 may be any non-transitory type of mass storage, such as volatile or non-volatile, magnetic, semiconductor-based, tape-based, optical, removable, non-removable, or other type of storage device or tangible computer-readable medium including, but not limited to, a read-only memory ("ROM"), a flash memory, a dynamic random-access memory ("RAM"), and/or a static RAM.

The communication interface 170 may be configured to communicate information between the computing device 130 and other devices or systems, such as the camera(s) 120, another computing device 130 or the other device(s) 140 as show in FIG. 1A. For example, the communication interface 170 may include an integrated services digital network ("ISDN") card, a cable modem, a satellite modem, or a modem to provide a data communication connection. As another example, the communication interface 170 may include a local area network ("LAN") card to provide a data communication connection to a compatible LAN. As a further example, the communication interface 170 may include a high-speed network adapter such as a fiber optic network adaptor, 10G Ethernet adaptor, or the like. Wireless links can also be implemented by the communication interface 170. In such an implementation, the communication interface 170 can send and receive electrical, electromagnetic or optical signals that carry digital data streams representing various types of information via a network. The network can typically include a cellular communication network, a Wireless Local Area Network ("WLAN"), a Wide Area Network ("WAN"), or the like. In some variations, the communication interface 170 may include various I/O devices such as a keyboard, a mouse, a touchpad, a touch screen, a microphone, a camera, a biosensor, etc. A user may input data to the computing device 130 (e.g., a terminal device) through the communication interface 170.

In some examples, a display may be integrated as part of the computing device 130 or may be provided as a separate device communicatively coupled to the computing device 130. The display may include a display device such as a Liquid Crystal Display ("LCD"), a Light Emitting Diode Display ("LED"), a plasma display, or any other type of display, and provide a Graphical User Interface ("GUI") presented on the display for user input and data depiction. In some instances, the display may be integrated as part of the communication interface 170.

A computing system may include any combination of the components in the network environment 100 as shown in FIG. 1A to carry out various functions/processes disclosed herein. In one example, a computing system may include one or more cameras 120 to obtain video streams and one or more computing devices 130 to receive and process the video streams. In another examples, a computing system may include a cloud storage (e.g., an NAS) storing training dataset and one or more computing devices 130 to retrieve the training dataset from the cloud storage and train a machine learning (ML) or artificial intelligence (AI) model implemented thereon.

A ML/AL model according to exemplary embodiments of the present disclosure may be extended to any suitable type of deep neural network (DNN) models. A DNN model includes multiple layers of interconnected nodes (e.g., perceptrons, neurons, etc.) that can be trained with enormous amounts of input data to quickly solve complex problems with high accuracy. The first layer in the DNN model, which receives input to the DNN model, is referred to as an input layer. The last layer in the DNN model, which produces outputs of the DNN model, is referred to as an output layer. Any layer between the input layer and the output layer of the DNN model is referred to as a hidden layer. The parameters/weights related to the DNN model may be stored in a memory (e.g., a memory 160 in a computing device 130) in the form of a data structure.

Figure 2:
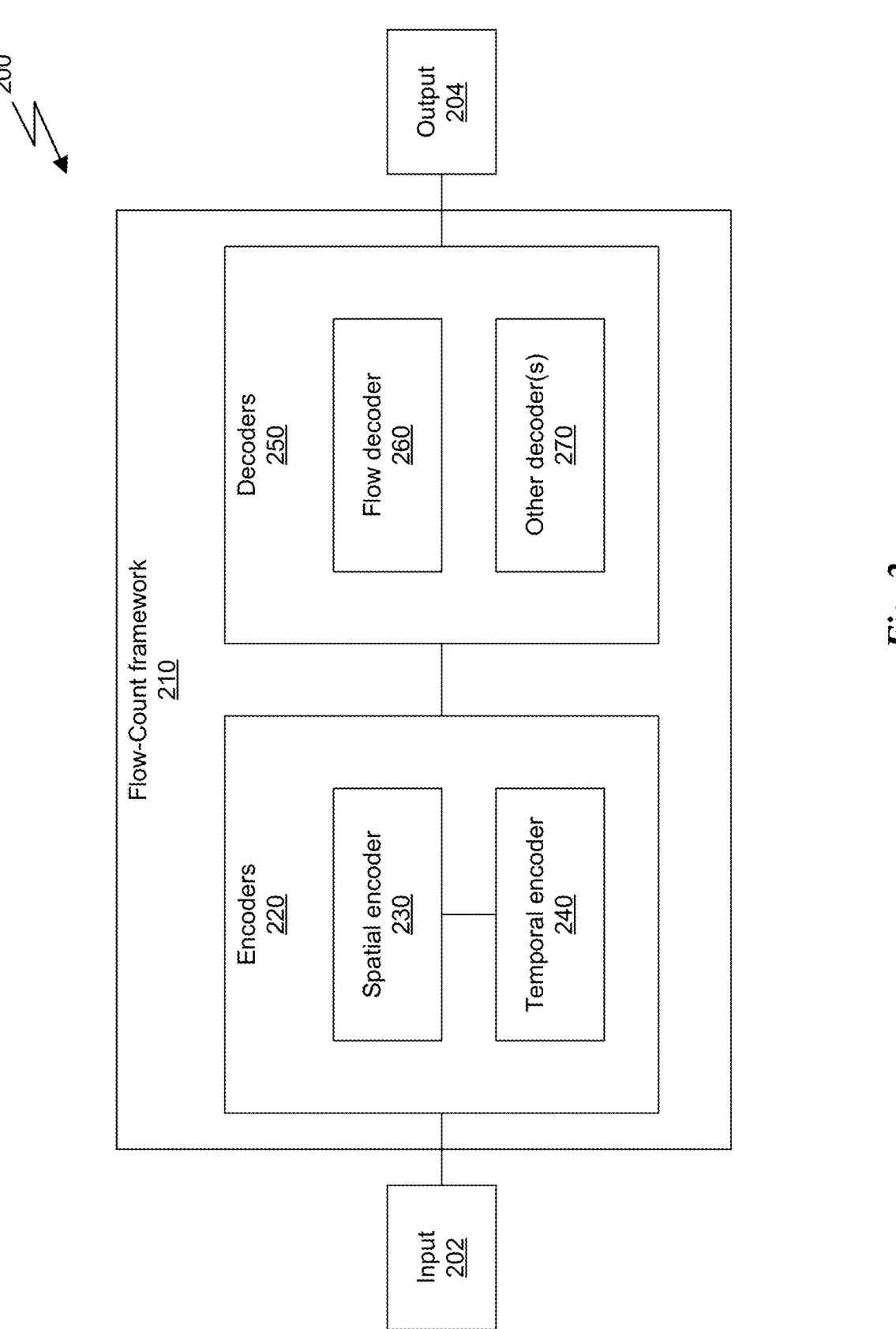
FIG. 2 is a block diagram of a Flow-Count scheme, in accordance with some embodiments.

FIG. 2 is a block diagram of a Flow-Count scheme 200, in accordance with some embodiments. As shown in FIG. 2, a Flow-Count framework 210 may be implemented to take input 202 and generate output 204. The Flow-Count framework 210 may be implemented on a processing system including one or more computing devices 130 as shown in FIG. 1A/1B. Accordingly, the Flow-Count scheme 200 may be executed by the processing system. It will be recognized that the scheme 200 may be performed in any suitable environment and that any of the following blocks may be implemented in any suitable arrangement.

The input 202 to the Flow-Count framework 210 are a sequence of consecutive video frames. The video frames are associated with suitable temporal information. For instance, each video frame may be stamped with a timestamp or a sequence number (in conjunction with a frame rate and starting time to calculate the time associated with a particular video frame). The video frames may record pedestrian data (or other suitable motion data, like traffic data) over time at a specific location in an environment of interest. The video frames may be acquired by a camera 120 directed at the specific location in the environment. In some variations, the video frames may be obtained based on videos recorded by multiple cameras 120 positioned at multiple locations in the environment. To this end, each video frame may be a combined image based on image frames acquired by the multiple cameras 120 at the same time.

The output 204 of the Flow-Count framework 210 may include a pixel-level flow map that derives from optical flow (e.g., an optical flow diagram) and records arbitrary speeds and directions with vectors in each pixel. The optical flow may be obtained based on motions of objects recorded in the video frames. For crowd counting applications, the Flow-Count framework 210 may process pedestrian data to generate a pixel-level people flow map. In the training stage, the Flow-Count framework 210 may use pixel-level people flow maps as supervisory signals for training one or more networks in the Flow-Count framework 210. In the inference stage, the Flow-Count framework 210 may use pixel-level people flow maps, for example combined with other suitable data (e.g., a density map), to achieve accurate people counting.

The Flow-Count framework 210 may include a number of functional modules configured to facilitate various functionalities. Each functional module may include one or more neural networks trained for specific functionalities/tasks. A neural network consists of interconnected nodes or "neurons" organized into layers. The nodes in each layer receive inputs, perform computations, and pass the results to the next layer until a final output is produced. Each node in a neural network has associated weights that determine the strength and importance of the connections between nodes. The weights refer to the parameters that are learned during the training process. Neural networks are widely used for tasks like image recognition, natural language processing, and speech synthesis.

Referring to FIG. 2, the various functional modules in the Flow-Count framework 210 include a module of encoders 220 and a module of decoders 250.

The encoders module 220 may include a spatial encoder 230 and a temporal encoder 240 to extract features from the input 202. For instance, the spatial encoder 230 may extract spatial features, while the temporal encoder 240 may extract temporal features. The spatial encoder 230 and temporal encoder 240 in the encoders module 220 may be connected in series, so that the Flow-Count framework 210 may extract spatial features and temporal features at different stages. In this configuration, the Flow-Count framework 210 may use features extracted from the previous stage to improve the extraction process in the following stage. In one example, the extracted features from the previous stage may be used to filter out irrelevant data to reduce the computational complexity of the next stage. In another example, the extracted features from the previous stage may be used to enhance information most relevant to the objects of interest to improve the performance of the next stage.

Alternatively, the spatial encoder 230 and temporal encoder 240 in the encoders module 220 may be connected in parallel, so that the Flow-Count framework 210 may concurrently extract spatial features and temporal features at a faster speed. In some variations, the encoders module 220 may include multiple spatial encoders 230 and multiple temporal encoders 240 connected in a hybrid configuration to balance between quality, computational complexity, and processing speed.

The decoders module 250 includes a flow decoder 260 and optionally other decoder(s) 270. The flow decoder 260 may use features extracted by the encoders module 220 to generate pixel-level flow maps for the output 204. Other decoder(s) 270 may include a density encoder to generate a density map, which is a representation that estimates the density of objects or events within an image or a video. It will be recognized by those skilled in the art that other suitable decoders may be used for generating other suitable information (e.g., heatmap, depth map, segmentation map, etc.) for other suitable applications.

Figure 3:
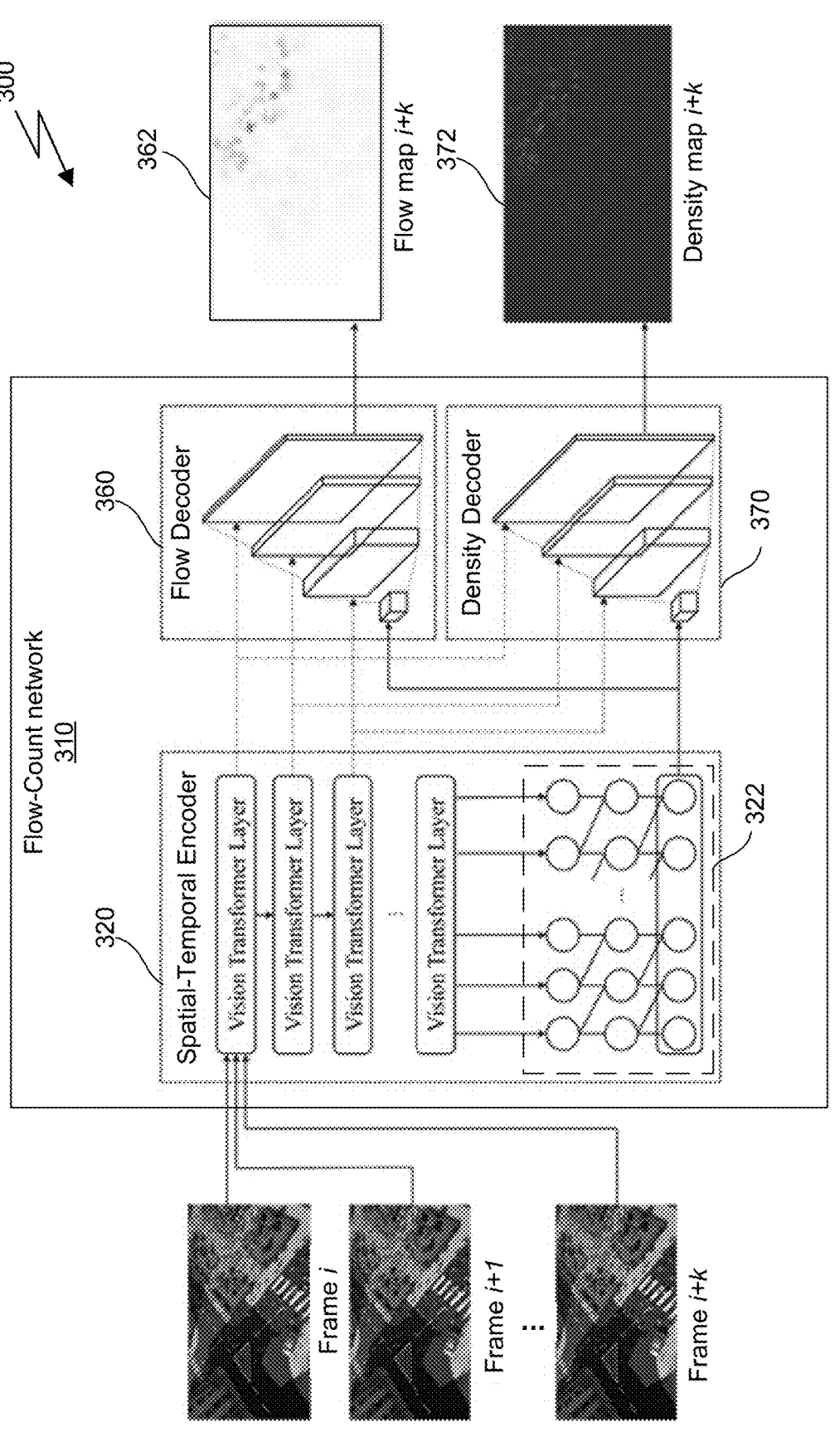
FIG. 3 is an exemplary implementation of a Flow-Count network, in accordance with the Flow-Count scheme as shown in FIG. 2.

An exemplary video crowd analysis system based on an exemplary Flow-Count network 310 as shown in FIG. 3 is described in details hereinafter. It will be appreciated that the exemplary video crowd analysis system is intended merely to better illustrate the disclosed technology and does not pose a limitation on the scope of the present disclosure.

FIG. 3 is an exemplary implementation 300 of a Flow-Count network 310, in accordance with the Flow-Count scheme 200 as shown in FIG. 2. The Flow-Count implementation 300 may be implemented on a processing system including one or more computing devices 130 as shown in FIG. 1A/1B. It will be recognized that the functions of the Flow-Count implementation 300 may be carried out in any suitable environment and that any of the following blocks may be implemented in any suitable arrangement.

Referring to FIG. 3, the Flow-Count implementation 300 includes a Flow-Count network 310, which takes a sequence of video frames (e.g., frames i, i+1, . . . , i+k) as input and outputs a flow map 362 and a density map 372 associated with a particular video frame. In this example, the Flow-Count network 310 uses (k+1) number of video frames to generate a flow map 362 and a density map 372 associated with the $(i+k)^{th}$ frame. The Flow-Count network 310 may generate a flow map 362 and a density map 372 based on two or more consecutive video frames (e.g., three frames may be used as the basis for generating a flow map 362 and a density map 372).

The Flow-Count network 310 includes a spatial-temporal encoder 320, a flow decoder 360, and a density decoder 370. The spatial-temporal encoder 320 processes the sequence of video frames to extract spatial and temporal features. The flow decoder 360 generates the flow map 362 based on the features extracted by the spatial-temporal encoder 320. Based on the same features extracted by the spatial-temporal encoder 320, the density decoder 370 generates the density map 372.

First, a representation for people flow map is established. The representation of a crowd video, consisting of multiple frames, may be denoted as $\{I_1, I_2, \ldots, I_n\}$. Each frame $I_i \varepsilon$ $\mathbb{R}^{H \times W \times 3}$ consists of pixels with three color bands, indicating their height, width, and color information. In some variations, each frame may consist of pixels with other suitable types of information, such as depths, distances (e.g., in heatmaps), etc. Ground truth annotations provided by video crowd counting datasets are usually coordinates of human head centers. For instance, for each video frame $I_i \varepsilon \mathbb{R}^{H \times W \times 3}$, human head centers are represented by point annotations $$H_i = \{h_1^i, h_2^i, \ldots, h_m^i\},$$

where $$h_j^i \in \mathbb{R}^2$$

is the coordinate of the head of the $j^{th}$ person in the $i^{th}$ video frame. The point annotations H may be used to generate a ground truth density map $D \in \mathbb{R}^{H \times W}$ for each video frame, $$D = \sum_{i=1}^{m} \delta(x - h_i) \times G_{\sigma_i}(x), \qquad \text{(Eq. 1)}$$

where $\delta(\bullet)$ is a delta function, $G(\bullet)$ is a Gaussian kernel and $\sigma_i = \beta \bar{d}_i$ is an adaptive kernel variance with $\bar{d}_i$ being an average distance between $h_i$ and k nearest neighbors. The adaptive $\sigma_i$ value is introduced to emulate the distortion caused by the homography between the ground plane and the image plane.

A people flow map is denoted as $F \in \mathbb{R}^{H \times W \times 2}$, where each pixel is a 2D vector representing the speed and direction of the crowd movement. Optical flow may be used for determining the crowd movement in videos. In some instances, optical flow may be provided in video datasets. In some variations, optical flow may be estimated through suitable optical flow networks. Typically, optical flow contains the motion of all pixels, including irrelevant objects. In the present disclosure, the Flow-Count network 310 processes the video data in such a way that only the movement of relevant objects (e.g., pedestrians) is captured to generate people flow maps.

In more detail, the Flow-Count network 310 generates a people flow map for video frame $I_i$ based on optical flow ($O \in \mathbb{R}^{H \times W \times 2}$) from $I_{i-1}$ to $I_i$, according to:

$$F = \sum_{i=1}^{m} O \times \delta(x - h_i) \times G_{\sigma_i}(x). \qquad \text{(Eq. 2)}$$

By applying the similar delta function of human head coordinates, the Flow-Count network 310 only captures the movement of people in the generated people flow maps, ignoring irrelevant objects. The use of Gaussian filter, inspired by the density map generation, addresses the issues that the maps can be highly sparse matrices and therefore are hard to estimate through deep neural networks. In this way, the Flow-Count network 310 generates pixel-level people flow maps, in which each pixel records the crowd movement in terms of speed and direction.

Figure 4:
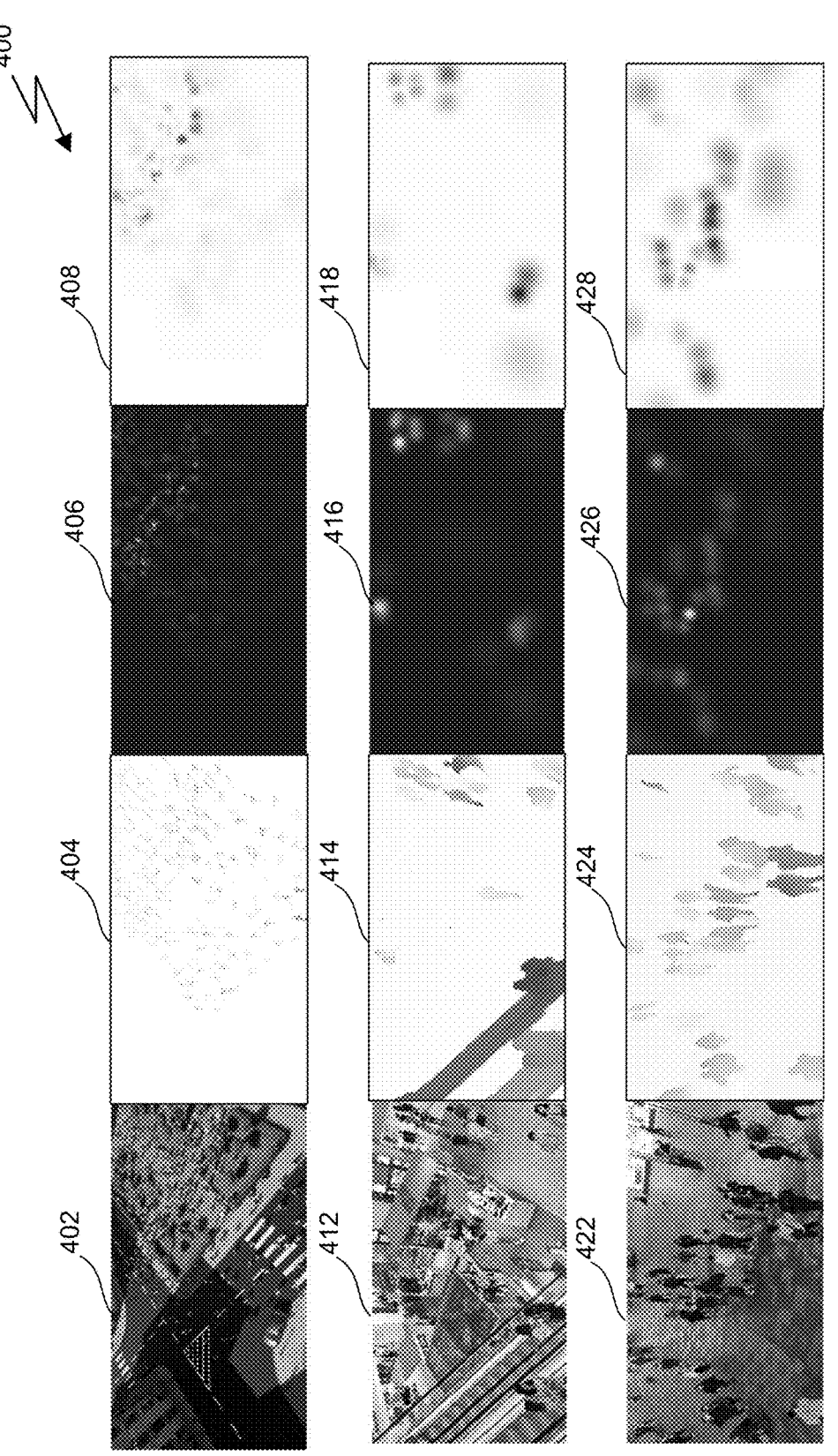
FIG. 4 shows examples of elements during training of a Flow-Count network, in accordance with some embodiments.

FIG. 4 shows examples 400 of elements during training of a Flow-Count network (e.g., the Flow-Count network 310).

Referring to FIG. 4, the first row of elements are related to training of the Flow-Count network 310 using the Crowd-Flow dataset, which is a synthetic dataset that contains ten sequences showing five scenes. 402 is an example video frame for a particular scene provided by the CrowdFlow dataset. 404 is a ground truth optical flow diagram associated with the video frame 402, which is provided by the CrowdFlow dataset. 406 is a density map that is generated by the Flow-Count network 310 for the video frame 402. 408 is a people flow map that is generated by the Flow-Count network 310 for the video frame 402.

The second and third rows present elements related to training of the Flow-Count network 310 using the VSCrowd dataset. The VSCrowd dataset is a large-scale crowd video bench mark introduced by Li et al., described in a literature titled "Video crowd localization with multifocus gaussian neighborhood attention and a large-scale benchmark," available at IEEE Transactions on Image Processing, 31:6032-6047, 2022. 2, 4, 6, 7. The VSCrowd dataset provides real-world dataset of video frames. 412 and 422 are example video frames for different scenes provided by the VSCrowd dataset. 414 and 424 are estimated optical flow diagrams for the video frames 412 and 422, respectively. The estimation of the optical flow diagrams 414 and 424 may be performed by a processing system using suitable techniques/algorithms, such as an approach proposed by Bai et al., described in a literature titled "Deep equilibrium optical flow estimation," available at Proceedings of the IEEE/CVF Conference on Computer Vision and Pattern Recognition, pages 620-630, 2022. 3, 4, 6. 416 and 426 are density maps generated by the Flow-Count network 310 for the video frames 412 and 422, respectively. 418 and 428 are people flow maps generated by the Flow-Count network 310 for the video frames 412 and 422, respectively.

It can be seen that the estimated optical flow diagrams can contain irrelevant objects. For example, in the second row, the optical flow diagram 414 contains information about the movement of the elevator. In contrast, the generated people flow maps (e.g., 408, 418, and 428) manage to focus on the crowd in videos and thus provides better supervision for people flow estimation. In some examples, the people flow maps may only be used as supervision signals rather than network inputs. In this way, optical flow estimation only needs to be done once in the training stage, while the trained network (e.g., the Flow-Count network 310) can operate solely on video frames in the inference stage.

Referring back to FIG. 3, the Flow-Count network 310 includes the spatial-temporal encoder 320, the flow decoder 360, and the density decoder 370.

The spatial-temporal encoder 320 may be employed at the beginning of the pipeline to extract features in the input video frames. The spatial-temporal encoder 320 consists of two primary modules. The first module may be a stack of spatial transformer layers, which gradually extracts the spatial features in the input frames at multiple scales. For instance, each scale of spatial features may be extracted by one or more transformer layers in the stack.

Transformer is a powerful deep learning model architecture that has revolutionized natural language processing (NLP) tasks. It employs a self-attention mechanism that allows it to capture contextual dependencies and relationships in a sequence of input data, such as words in a sentence. This attention mechanism enables the transformer to achieve state-of-the-art performance in tasks like machine translation, text summarization, and language understanding by capturing long-range dependencies and modeling relationships between words or tokens.

Transformer may be adapted to vision tasks by regarding small patches of the image as words and processing the whole image as a sequence of words. In some examples, hierarchical designs and shifted-window mechanisms may be implemented to cope with scale variation and optimize computational efficiency. Hierarchical designs refer to the organization of complex systems or models into multiple levels or layers of abstraction. Each layer focuses on a specific aspect or level of detail, enabling efficient and modular design. Shifted-window mechanisms are used in certain algorithms or models, such as convolutional neural networks (CNNs), to efficiently process data by sliding a window or filter across the input. The image patches are progressively updated by the self-attention modules, where the network extracts and encodes useful image features according to:

$$\text{Attention } (Q, K, V) = SoftMax \left( \frac{QK^T}{\sqrt{d}} \right) V, \qquad \text{(Eq. 3)}$$

where Q, K, V are the query, key and value matrices derived from each image patch, d is their dimension. By self-attention mechanism, transformer layers enable long-range contextual feature extraction, while the shifted-window enhances local range feature processing.

After encoding the spatial dimension, the spatial-temporal encoder 320 of the Flow-Count network 310 continues to process along the temporal dimension, which contains the crowd flow information across multiple frames. A temporal convolutional network (TCN) 322 is deployed to extract temporal features. To this end, the spatial-temporal encoder 320 of the Flow-Count network 310 processes input data both spatially and temporally to extract features for both the counting and the flow estimation tasks.

The flow decoder 360 and the density decoder 370 are convolutional decoders arranged in parallel in the Flow-Count network 310. The extracted video features from the spatial-temporal encoder 320 are passed to the flow decoder 360 and the density decoder 370 to construct the people flow map 362 and the density map 372, respectively. Jump connections may be implemented to fully utilize the details at each processing scale (e.g., to extract spatial features at a particular scale). As shown in FIG. 3, the transformer layers in the spatial-temporal encoder 320 may be connected to corresponding layers in the flow decoder 360 and the density decoder 370. In this way, the decoders 360 and 370 can directly access the hierarchical pyramid features from the encoder 320 and gradually refine the estimated density maps 372 and people flow maps 362. The decoders 360 and 370 may have very similar architectures, but may differ in the number of filters in the output layers.

In more detail, the density decoder 370 is regressing a density map $\hat{D} \in \mathbb{R}^{H \times W}$, while the flow decoder 360 estimates a people flow map $\hat{F} \in \mathbb{R}^{H \times W \times 2}$. The density map decoder is optimized by a mean-squared density map construction loss, $$L_d = \frac{\sum_{ij} |\hat{D}_{ij} - D_{ij}|}{n}. \tag{Eq. 4}$$

The flow decoder 360 is trained by a people flow map construction loss, $$L_f = \frac{\sum_{ij} |\hat{F}_{ij}^1 - F_{ij}^1| + |\hat{F}_{ij}^2 - F_{ij}^2|}{n}. \tag{Eq. 5}$$

The final loss for backpropagation may be a sum of the two losses computed in Equations 4 and 5, $$L = L_d + L_f \tag{Eq. 6}$$

In some variations, the final loss may be computed by a weighted sum of the two losses computed in Equations 4 and 5. Weights may be adjusted to adjust the contributions from the two prediction branches (e.g., associated with the decoders 360 and 370, respectively).

During the training stage, both prediction branches contribute to network learning and backpropagate to video encoder layers in the front. The density construction loss (e.g., $L_d$) propels the video encoder (e.g., the spatial-temporal encoder 320) to locate and count pedestrians, while the people flow map construction loss (e.g., $L_f$) boosts its ability to capture people flow. Given a well-trained video encoder, since the two decoders are parallel to each other, it is possible to disable the flow decoder 360 and only keep the density decoder 370 in the inference stage, while still retaining high counting accuracy. Apart from inference efficiency, this design also increases the flexibility of the Flow-Count network 310, as two prediction branches can be adaptively enabled and disabled according to practical demands in real applications.

FIG. 5 is a flowchart of a Flow-Count process 500, in accordance with some embodiments. The process 500 may be performed by a processing system including one or more computing devices 130 as shown in FIG. 1A/1B. The processing system implements a Flow-Count network as shown in FIG. 2/3. In some embodiments, the processing system may further include one or more cameras 120 for data collection. It will be recognized that the process 500 may be performed in any suitable environment and that any of the following blocks may be performed in any suitable order.

To illustrate as an example, the process 500 is implemented for a people counting application, by processing composite or video frames recorded by a camera 120 in a network environment 100 as shown in FIG. 1A. The camera 120 may be positioned at a specific geographic location to cover a region of interest, for example a street segment or a traffic junction. It should be noted that the exemplary application of people counting is described solely for illustration purposes and is not intended to limit the scope of the present disclosure.

At block 510, the processing system obtains a video stream. The video stream comprises a sequence of frames and each frame comprises a plurality of pixels. The video stream may be recorded by the camera 120 over time for a particular region of interest. In some examples, the processing system may use video streams provided by existing datasets to train the Flow-Count network implemented thereon.

At block 520, the processing system extracts spatial features and temporal features based on the sequence of frames. The processing system applies the encoders module 220 in the Flow-Count framework 210 as shown in FIG. 2 to process the input sequence of frames to extract spatial features and temporal features across the sequence of frames. In some instances, the processing system may use the spatial-temporal encoder 320 as shown in FIG. 3 to first encode the spatial dimension and generate spatial features at multiple scales, and then encode the temporal dimension to generate temporal features.

At block 530, the processing system constructs a flow map and/or a density map based on the spatial features and the temporal features extracted from the sequence of frames. The flow map and/or the density map are associated with a particular frame of the sequence of frames.

In some examples, when implementing the Flow-Count framework 210 as shown in FIG. 2, the processing system applies the decoders module 250 to generate a flow map and one or more other suitable maps.

In some instances, when implementing the Flow-Count network 310 as shown in FIG. 3, the processing system utilizes the flow decoder 360 and the density decoder 370 to process the spatial features and the temporal features from the spatial-temporal encoder 320 to generate the flow map 362 and the density map 372, respectively.

In some variations, the processing system may flexibly enable/disable any decoder at different stages or under different usage scenarios. For example, the processing system may be configured to generate only flow maps, only density maps, or both flow maps and density maps. In one example, the processing system may generate only flow maps and provide the flow maps to another computing system (e.g., a server or client device) as supervision signals. In another example, the processing system may normally operate only with the density decoder enabled, and occasionally enable both the flow and density decoders to calibrate the Flow-Count network and/or check the confidence level of the prediction results (e.g., people counts).

During the training stage, the processing system may compute losses between the generated maps (e.g., flow maps, density maps, etc.) and the ground truth maps to train the Flow-Count network. For instance, the processing system may apply Equations 4-6 to compute losses and backpropagate the losses to update the network model.

During the inference stage, the processing system may enable or disable the prediction branch associated with the flow decoder depending on the computational budget and precision requirements. Additionally and/or alternatively, if an application only cares about the count but not the flow, it can detach the flow decoder and keep only the density decoder during the inference stage.

At block 540, the processing system determines count, distribution, and/or movements of objects contained in the particular frame of the sequence of frames based on the density map and/or the flow map. For example, the processing system determines a number of people in the particular frame of the sequence of frames based on the density map and/or the flow map. The processing system may also use the flow map generated by the Flow-Count network as a supervision signal. For example, the processing system may not predict the number of people in the particular frame of the sequence of frames based on the other map(s) (e.g., the density map) generated by the Flow-Count network and utilize the flow map, for example as ground truth, to make corrections to the prediction of the people count. Additionally and/or alternatively, the Flow-Count framework may use the flow map to compute a confidence level for the people count prediction.

Illustrative experimental results are described in detail below to demonstrate efficacy and advantages of the present disclosure.

Implementation Details

A pre-trained Swin-Base model is used as the spatial transformer in the video encoder (e.g., the spatial-temporal encoder 320 as shown in FIG. 3). The TCN (e.g., 322) contains three convolutional layers that operate on the temporal dimension with the kernel size to be 1 and ReLU as activation. The two CNN decoders (e.g., the flow decoder 360 and the density decoder 370) each has jump connections to the $2^{nd}$, $4^{th}$, $2^{nd}$ and $24^{th}$ layer of the video encoder. AdamW optimizer is used to avoid over-fitting issue and a cosine cycle scheduler is applied to control the learning rate. During training and inference stage, images, density maps and people flow maps are trimmed into 224×224 patches. The network is trained on an RTX3090 GPU for 18 hours.

Dataset and Baseline

The experiments are conducted on three representative video crowd counting datasets.

CrowdFlow is a synthetic video crowd dataset for crowd analysis and optical flow estimation. The dataset annotates 5 crowd scenes and 3200 video frames in total, with an average crowd count to be 319.1. This dataset also provides ground truth optical flow which is used for people flow map generation. In order to have a fair comparison, the dataset is split to achieve a fair comparison. For example, the first three sequences are used as the training set, while the remaining two sequences are used as the testing set.

CroHD dataset is the benchmark for Head Tracking 21 challenge, originally collected for the multiple-object tracking task while the tracking targets are human heads. The dataset provides human heads identities and bounding box annotations for each video frame. The dataset is adapted for the crowd counting task by regarding the center of each bounding box as the head position annotation. An existing optical flow network is used to estimate optical flow for this dataset. The first three scenes are used for training, while the fourth scene is used for testing.

VSCrowd is a large-scale video crowd dataset with 634 video sequences covering various crowd scenes, which is significantly higher than the other two datasets and thus is suitable for validating the approach of the present disclosure over diverse people flow. The optical flow network used for the CroHD dataset is also used to estimate optical flow for the VSCrowd dataset. An official data split on this dataset may be applied to use this dataset for training and testing.

On these three datasets, the experiment compares the performance between the Flow-Count of the present disclosure and the following opponents.

MCNN, CSRNet, and CAN are three typical representatives of single-image crowd counting methods, which are not capable of extracting temporal information across multiple video frames.

PHNet is a video crowd counting network that adopts a spatial-temporal two-stream design. Although a spatial-correlation mechanism is implemented, the network is not explicitly trained to extract flow information in videos.

Grid-Flow and MOPN incorporate crowd flow information by applying a grid-based representation or inputting optical flow to the network. "Grid-Flow" will be used for convenience as no official name is given for the method. The grid-based design provides better constraints for density regression. However, the choice of grid size as a hyperparameter becomes a crucial factor and may require scene-dependent finetuning. A larger grid size would better capture longer displacement but compromise the flow precision at the same time. Different movements can be regarded as the same flow simply because they begin and end in the same grid. On the other hand, a smaller grid size would lose the details of those faster people flow.

The evaluation metrics used for counting are mean absolute error (MAE) and root mean squared error (RMSE):

$$MAE = \frac{1}{N}\sum_{i=1}^{N}|c_i - \hat{c}_i|, \qquad \text{(Eq. 7)}$$

$$RMSE = \sqrt{\frac{1}{N}\sum_{i=1}^{N}(c_i - \hat{c}_i)^2}, \qquad \text{(Eq. 8)}$$

where $c_i$ and $\hat{c}_i$ are the ground truth count and estimated count of the $i^{th}$ frame. Since the people flow representation is defined by the present disclosure and there is no corresponding public benchmarks, the experiment only evaluates the estimated people flow maps in the ablation study according to their structural similarity index measure (SSIM) to the ground truth generated. Table 1 compares the performance of the Flow-Count method with the above-listed existing methods. The Flow-Count-O model is trained with raw optical flow instead of the people flow maps as an ablation study.

TABLE 1

| | | | CrowdFlow | | CroHD | | VSCrowd | |
|---|---|---|---|---|---|---|---|---|
| Comparison of performance between the Flow-Count approach and existing methods. | | | | | | | | |
| | Type | Flow | MAE | RMSE | MAE | RMSE | MAE | RMSE |
| MCNN | Image | X | 172.8 | 216.0 | 10.1 | 12.4 | 27.1 | 46.9 |
| CSRNet | Image | X | 137.8 | 181.0 | 10.3 | 11.9 | 13.8 | 21.1 |
| CAN | Image | X | 124.3 | 160.2 | 11.2 | 13.0 | 10.3 | 14.9 |
| PHNet | Video | X | 107.9 | 127.6 | 11.5 | 13.2 | 9.4 | 13.1 |
| Grid-Flow | Video | ✓ | 90.9 | 110.3 | 9.7 | 11.2 | 8.5 | 11.3 |
| MOPN | Video | ✓ | 88.7 | 106.9 | 10.2 | 11.9 | 8.4 | 11.0 |
| Flow-Count-O | Video | ✓ | 87.1 | 106.6 | 8.2 | 9.6 | 7.8 | 10.3 |
| Flow-Count | Video | ✓ | 84.8 | 102.7 | 7.8 | 9.2 | 7.6 | 9.9 |

Performance

Table 1 lists the performance of the Flow-Count method of present disclosure as well as other existing crowd counting methods on the three datasets. First of all, from the observation, there is a significant gap between video-based methods and image-based methods, especially in the Crowd-Flow dataset, which echos the observation that temporal information can be essential to boost counting accuracy. On the other hand, how to utilize the temporal information is also critical. For example, Table 1 shows that PHNet is even beaten by image-based methods in the CroHD dataset. This suggests that simply feeding extra inputs without proper supervision signal may not necessarily enhance the network, but rather confuse it.

Secondly, Table 1 shows that flow-involved methods outperform the others. For example, in the VSCrowd dataset, the three flow-involved methods, including the Flow-Count, achieve leading performance over the rest, which again confirms the insight that people flow is the key factor to improve video crowd counting. By incorporating people flow, the Flow-Count network can better utilize the extra temporal information in videos and count more accurately in all three datasets.

Finally, the Flow-Count method achieves a significant lead over Grid-Flow and MOPN on all three datasets. In the CroHD dataset, the Flow-Count method beats Grid-Flow with a 1.81 (18.66%) lower MAE together with a 2.06 (18.38%) lower RMSE. Moreover, in the VSCrowd dataset, Flow-Count reduces MAE by 9.5% and RMSE by 10% compared with MOPN. The result shows the effectiveness of the multi-task network design in the Flow-Count network. It also supports the superiority of the pixel-level people flow map representation, which captures people flow more precisely and removes irrelevant objects in raw optical flow.

Ablation Study

In order to validate the efficacy of the people flow maps, a Flow-Count-O model is trained with raw optical flow. The performance of the Flow-Count-O model is compared with the Flow-Count network in Table 1. The results indicate that people flow maps provide better supervision than raw optical flow, especially on the CroHD and VSCrowd datasets, where people flow maps remove irrelevant objects from estimated optical flow. The gap on the CrowdFlow dataset is relatively smaller, likely because the synthetic dataset provides ground truth optical flow.

Then, the ablation study is conducted to evaluate the effectiveness of the multi-task scheme, where one prediction branch is disabled and the performance of another is evaluated. The results are listed in Table 2.

TABLE 2

| | CrowdFlow | | CroHD | |
|---|---|---|---|---|
| Results of ablation study, where one prediction branch of Flow-Count is disabled and the performance of another is evaluated. | | | | |
| | MAE | SSIM | MAE | SSIM |
| Flow-Count without Flow | 98.1 | — | 10.1 | — |
| Flow-Count without Count | — | 0.931 | — | 0.907 |
| Full Flow-Count | 84.8 | 0.937 | 7.9 | 0.912 |

With the flow prediction head disabled, Flow-Count essentially degrades to a normal 3D autoencoder that regresses density maps based on a few video frames as inputs. The temporal information can still be exploited by the temporal convolution module. However, no flow information is explicitly modeled and supervised. The network performance drops significantly by 13.3 (13.56%) in the CrowdFlow dataset, notably inferior to the full Flow-Count and the Grid-Flow network, and drops by 2.24 (22.11%) in the CroHD dataset, which is even worse than some of the image-based methods. The result proves that the auxiliary flow prediction task has greatly enhanced the network's ability to capture and utilize the heterogeneous crowd flow information in videos to boost crowd counting accuracy.

On the other hand, with the crowd counting prediction head disabled, Flow-Count becomes a people flow map regressor that tries to estimate the movement of pedestrians in videos. Without the help of the counting branch, the quality of the estimated people flow maps also drops. This result indicates that the counting task could also improve flow estimation in Flow-Count. Finally, it is concluded that flow estimation and crowd counting are two highly correlated tasks that can mutually improve each other, and the multi-task network design effectively exploits it.

Efficiency

The Flow-Count method of the present disclosure is efficient from two aspects. First, compared with Grid-Flow, the pixel-level people flow map does not rely on a hyperparameter such as grid size. In other words, the pixel-level people flow map does not require prior knowledge on people flow, and thus does not require fine-tuning of a hyperparameter when applied to new scenes. Second, people flow maps can only be used as supervision signals during the training stage. During the inference stage, the entire flow decoder can be detached to reduce computational cost, and the network does not wait for optical flow estimation. The MOPN network is reproduced such that it has a comparable model size to the Flow-Count network. Then, the inference speed of the MOPN network and the Flow-Count network is tested on images of 1920×1080 resolution. The results show that Flow-Count takes 0.227 seconds on average to process a frame, while MOPN requires 0.053 seconds for optical flow estimation and 0.236 seconds for the rest of the network. While the difference in performance between the Flow-Count network and the MOPN network may be marginal at 3.9%, it becomes significantly larger at 21.5% when optical flow estimation is taken into account. This outcome validates the approach of utilizing flow as supervision signals rather than an input in the disclosed Flow-Count framework.

Robustness

As the foregoing illustrates, the ground truth people flow maps of the present disclosure are derived from optical flow. The next step is to study how robust the Flow-Count network is against optical flow noises. For example, random Perlin noises are added to the ground truth optical flow in the CrowdFlow dataset. Then, the Flow-Count network is tested to examine how the noises influence the network performance. The amount of noises is proportionate to the value range of the optical flow and is controlled by a factor $\alpha\varepsilon[0,1]$.

Figure 6:
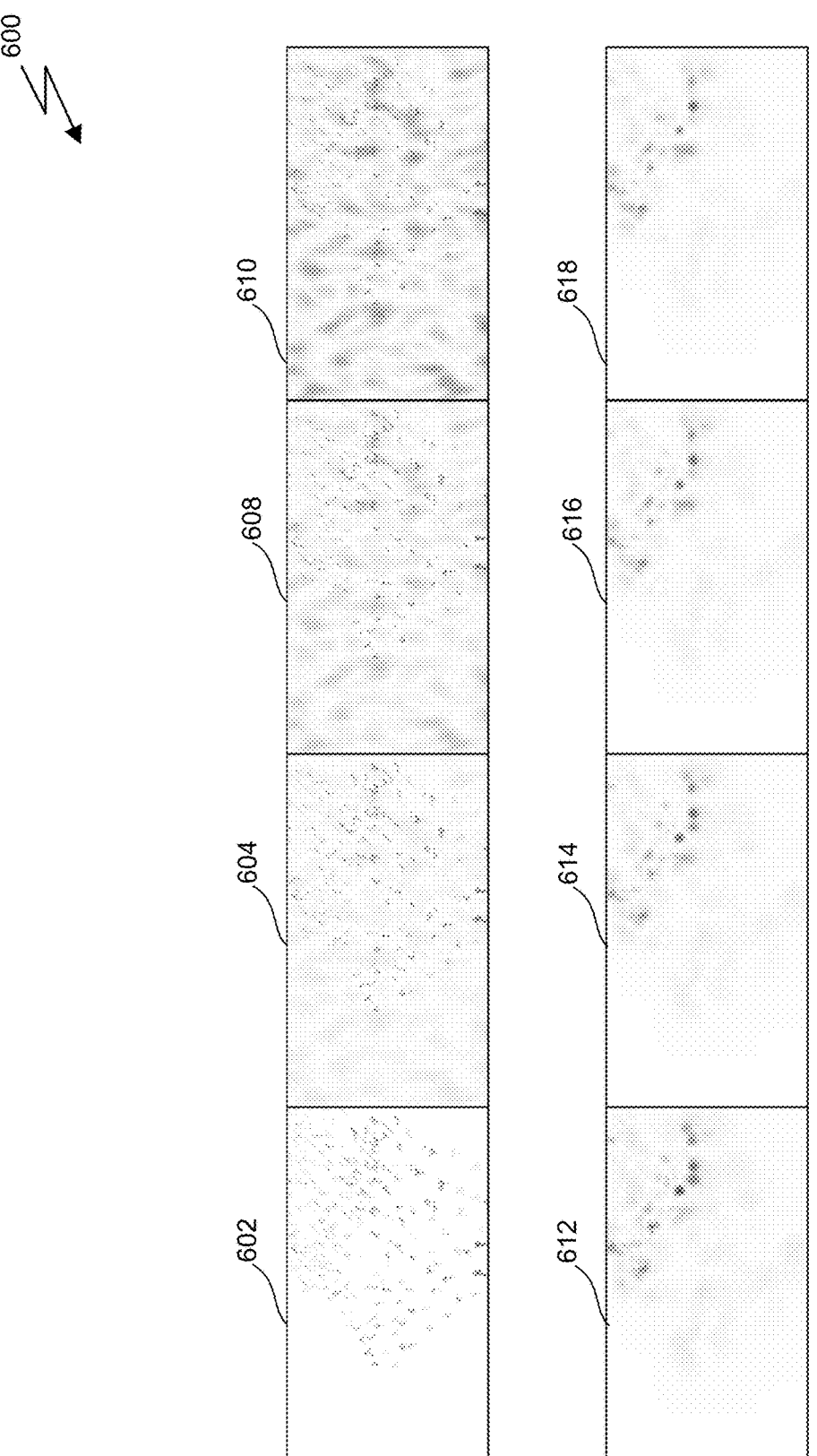
FIG. 6 shows examples of optical flow diagrams and people flow maps affected by the random Perlin noises, in accordance with some embodiments.

FIG. 6 shows examples 600 of optical flow diagrams and people flow maps affected by the random Perlin noises. Random Perlin noises $\varepsilon[-\alpha D, \alpha D]$, where $D=\max(0)-\min(0)$ is the value range of the optical flow, are added to the CrowdFlow dataset to train the Flow-Count network on newly generated people flow maps. Referring to FIG. 6, the first row shows the optical flow for different values of the factor $\alpha$. For example, 602, 604, 606, and 608 are optical flow diagrams for $\alpha=0$, 0.1, 0.2, and 0.3, respectively. The second row shows corresponding people flow maps for different values of the factor $\alpha$. For example, 612, 614, 616, and 618 are people flow maps for $\alpha=0$, 0.1, 0.2, and 0.3, respectively. The first column where $\alpha=0$ is essentially the non-noisy ground truth.

From the naked eye, even if there are noises in the optical flow diagrams, the generated people flow maps are highly similar. As mentioned above, the people flow map of the present disclosure can ignore non-people objects and focus on the crowd, thereby eliminating noises in the background.

Figure 7:
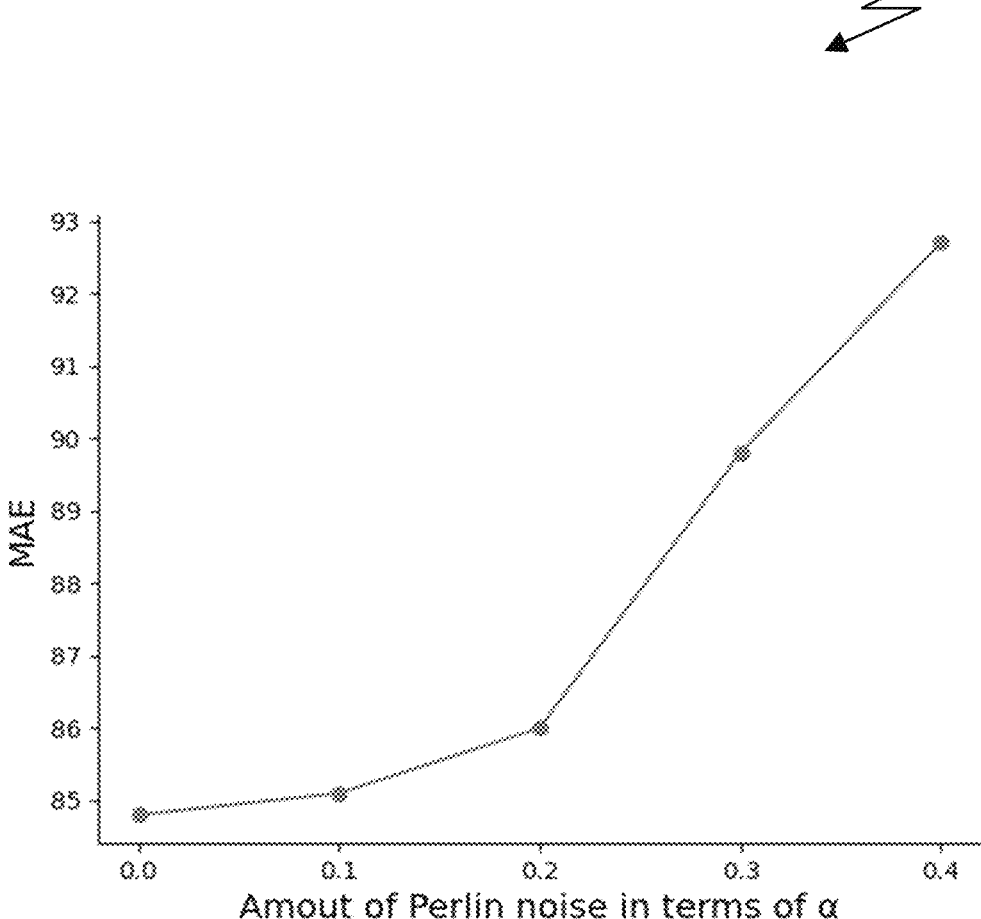
FIG. 7 demonstrates a process for determining a trajectory, in accordance with some embodiments.

FIG. 7 is a plot 700 of the performance curve with respect to the amount of noises added. The performance curve demonstrates the stability of the Flow-Count network within a noise factor ($\alpha$) range of 0.2, while still achieving acceptable performance (92.7 MAE) even when the noise factor increases to 0.4. It is noteworthy that the performance of the Flow-Count network, using noisy optical flow, is nearly on par with the Grid-Flow network trained on clean ground truth.

It is noted that the techniques described herein may be embodied in executable instructions stored in a non-transitory computer readable medium for use by or in connection with a processor-based instruction execution machine, system, apparatus, or device. It will be appreciated by those skilled in the art that, for some embodiments, various types of computer-readable media can be included for storing data. As used herein, a "computer-readable medium" includes one or more of any suitable media for storing the executable instructions of a computer program such that the instruction execution machine, system, apparatus, or device may read (or fetch) the instructions from the computer-readable medium and execute the instructions for carrying out the described embodiments. Suitable storage formats include one or more of an electronic, magnetic, optical, and electromagnetic format. A non-exhaustive list of conventional exemplary computer-readable medium includes: a portable computer diskette; a random-access memory (RAM); a read-only memory (ROM); an erasable programmable read only memory (EPROM); a flash memory device; and optical storage devices, including a portable compact disc (CD), a portable digital video disc (DVD), and the like.

It should be understood that the arrangement of components illustrated in the attached Figures are for illustrative purposes and that other arrangements are possible. For example, one or more of the elements described herein may be realized, in whole or in part, as an electronic hardware component. The elements may be implemented in software, hardware, or a combination of software and hardware. Moreover, some or all of these other elements may be combined, some may be omitted altogether, and additional components may be added while still achieving the functionality described herein. Thus, the subject matter described herein may be embodied in many different variations, and all such variations are contemplated to be within the scope of the claims.

To facilitate an understanding of the subject matter described herein, many aspects are described in terms of sequences of actions. It will be recognized by those skilled in the art that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The invention claimed is:

1. A system, comprising:

one or more cameras configured to capture image data, the image data comprising a video stream that comprises a sequence of frames, each frame comprising a plurality of pixels; and a processing system configured to:

extract spatial features and temporal features based on the sequence of frames;

construct, based on the spatial features and temporal features, a flow map corresponding to a frame of the sequence of frames, wherein the flow map comprises two-dimensional (2D) vectors for the plurality of pixels, wherein each pixel of the flow map corresponds to a respective 2D vector, wherein each respective 2D vector indicates a speed and direction for a respective pixel of the plurality of pixels in the frame, and wherein the speed and direction for the respective pixel represents a speed and direction of a crowd movement;

determine, based on the flow map, movement of objects corresponding to the frame, including the crowd movement; and perform crowd management based on the crowd movement contained in the frame of the sequence of frames.

2. The system of claim 1, wherein to extract the spatial features and temporal features based on the sequence of frames, the processing system is further configured to:

extract, using an encoder comprising a transformer with a plurality of transformer layers and a convolutional network connected in series, the spatial features at different scales for each frame of the sequence of frames, wherein the spatial features at a given scale are produced by a corresponding transformer layer of the plurality of transformer layers; and extract the temporal features from the sequence of frames, wherein the convolutional network is configured to process the spatial features output by the last transformer layer of the plurality of transformer layers so as to produce the temporal features.

3. The system of claim 2, wherein the construction, based on the spatial features and temporal features, of the flow map corresponding to the frame of the sequence of frames is based on the spatial features at the different scales and the temporal features.

4. The system of claim 2, wherein the spatial features at the different scales and the temporal features for the sequence of frames are extracted in sequence.

5. The system of claim 2, wherein the spatial features at the different scales and the temporal features for the sequence of frames are extracted concurrently.

6. The system of claim 2, wherein the processing system is further configured to:

construct, based on the spatial features at the different scales and the temporal features, a density map corresponding to the frame of the sequence of frames, wherein the density map comprises density values for the plurality of pixels; and determine, based on the flow map and the density map, at least one of a count or a distribution of the objects corresponding to the frame.

7. The system of claim 6, wherein the processing system is further configured to:

filter, based on the spatial features at the different scales and the temporal features, data irrelevant to the objects contained in the sequence of video frames, wherein the constructed density map and flow map associated with the frame do not include the irrelevant data.

8. The system of claim 7, wherein the objects are persons contained in the sequence of video frames, wherein the irrelevant data includes non-human objects, and wherein the constructed density map and flow map do not include non-human objects.

9. The system of claim 1, wherein the processing system is further configured to:

compute a first loss between the constructed flow map and a ground-truth flow map for the frame of the sequence of frames; and train, based on the first loss, a model for determining the count, distribution, and movement of the objects contained in the frame of the sequence of frames.

10. The system of claim 9, wherein the processing system is further configured to:

construct, based on the spatial features and temporal features, a density map corresponding to the frame of the sequence of frames, wherein the density map comprises density values for the plurality of pixels;

compute a second loss between the constructed density map and a ground-truth density map for the frame of the sequence of frames; and train, based on the first loss and the second loss, the model for determining at least one of a count, a distribution, or the movement of the objects contained in the frame of the sequence of frames.

11. The system of claim 1, wherein the processing system is further configured to:

perform at least one of crowd management, service optimization, or security monitoring based on the count, distribution, and movement of the objects contained in the frame of the sequence of frames.

12. A method, comprising:

obtaining, by a processing system, a video stream comprising a sequence of frames, each frame comprising a plurality of pixels;

extracting, by the processing system, spatial features and temporal features based on the sequence of frames;

constructing, by the processing system, based on the spatial features and the temporal features, a flow map corresponding to a frame of the sequence of frames, wherein the flow map comprises two-dimensional (2D) vectors for the plurality of pixels, wherein each pixel of the flow map corresponds to a respective 2D vector, wherein each respective 2D vector indicates a speed and direction for a pixel of the plurality of pixels in the frame, and wherein the speed and direction for the respective pixel represents a speed and direction of a crowd movement;

determining, by the processing system, based on the flow map, movement of objects corresponding to the frame, including the crowd movement; and performing, by the processing system, crowd management based on the crowd movement contained in the frame of the sequence of frames.

13. The method of claim 12, wherein extracting the spatial features and temporal features based on the sequence of frames further comprises:

extracting, by the processing system implementing an encoder comprising a transformer with a plurality of transformer layers and a convolutional network connected in series, the spatial features at different scales for each frame of the sequence of frames, wherein the spatial features at a given scale are produced by a corresponding transformer layer of the plurality of transformer layers; and extracting, by the processing system, the temporal features from the sequence of frames, wherein the convolutional network is configured to process the spatial features output by the last transformer layer of the plurality of transformer layers so as to produce the temporal features.

14. The method of claim 13, wherein the constructing, by the processing system, based on the spatial features and temporal features, the flow map corresponding to the frame of the sequence of frames is based on the spatial features at the different scales and the temporal features.

15. The method of claim 13, wherein the spatial features at the different scales and the temporal features for the sequence of frames are extracted in sequence.

16. The method of claim 13, wherein the spatial features at the different scales and the temporal features for the sequence of frames are extracted concurrently.

17. The method of claim 13, further comprising:

constructing, based on the spatial features at the different scales and the temporal features, a density map corresponding to the frame of the sequence of frames, wherein the density map comprises density values for the plurality of pixels, and determining, based on the flow map and the density map, at least one of a count or a distribution of the objects corresponding to the frame.

18. The method of claim 17, further comprising:

filtering, by the processing system, based on the spatial features at the different scales and the temporal features, data irrelevant to the objects contained in the sequence of video frames, wherein the constructed density map and flow map associated with the frame do not include the irrelevant data.

19. The method of claim 18, wherein the objects are persons contained in the sequence of video frames, wherein the irrelevant data includes non-human objects, and wherein the constructed density map and flow map do not include non-human objects.

20. A non-transitory computer-readable medium having processor-executable instructions stored thereon, wherein the processor-executable instructions, when executed, facilitate performance of the following:

obtaining a video stream comprising a sequence of frames, each frame comprising a plurality of pixels;

extracting spatial features and temporal features based on the sequence of frames;

constructing, based on the spatial features and temporal features, a flow map corresponding to a frame of the sequence of frames, wherein the flow map comprises two-dimensional (2D) vectors for the plurality of pixels, wherein each pixel of the flow map corresponds to a respective 2D vector, wherein each respective 2D vector indicates a speed and direction for a pixel of the plurality of pixels in the frame, and wherein the speed and direction for the respective pixel represents a speed and direction of a crowd movement;

determining, based on the flow map, a count, a distribution, and movement of objects corresponding to the frame, including the crowd movement; and performing crowd management based on the crowd movement contained in the frame of the sequence of frames.

* * * * *